United States Patent
Diatzikis et al.

(10) Patent No.: US 8,925,881 B2
(45) Date of Patent: Jan. 6, 2015

(54) MAGNETIC MOUNT

(76) Inventors: Anna Genevieve Diatzikis, Chuluota, FL (US); Vasilios Evan Diatzikis, Chuluota, FL (US); Dominic Evangelos Diatzikis, Chuluota, FL (US); Isaiah Monty Simmons, Lenoir, NC (US)

( * ) Notice: Subject to any disclaimer, the term of this patent is extended or adjusted under 35 U.S.C. 154(b) by 0 days.

(21) Appl. No.: 13/481,886

(22) Filed: May 28, 2012

(65) Prior Publication Data
US 2013/0313388 A1 Nov. 28, 2013

(51) Int. Cl.
*A47G 1/17* (2006.01)

(52) U.S. Cl.
USPC .............. 248/206.5; 248/205.5; 248/206.2; 248/205.7

(58) Field of Classification Search
USPC .......... 248/205.5, 205.6, 205.7, 205.8, 205.9, 248/206.1, 206.2, 363, 362, 309.3, 683, 248/467, 206.5
See application file for complete search history.

(56) References Cited

U.S. PATENT DOCUMENTS

| | | | |
|---|---|---|---|
| 2,707,298 A | 5/1955 | Wiest | |
| 3,042,111 A | 7/1962 | Wytovich | |
| 3,148,856 A * | 9/1964 | Orlando | 248/205.6 |
| 3,325,639 A * | 6/1967 | King | 362/270 |
| 4,251,960 A | 2/1981 | Large | |
| 4,351,557 A * | 9/1982 | Chary | 296/97.7 |
| 5,028,223 A * | 7/1991 | Ameter | 425/12 |
| 5,040,841 A | 8/1991 | Yang | |
| 5,065,973 A * | 11/1991 | Wang | 248/362 |
| 5,192,043 A * | 3/1993 | Fa | 248/206.2 |
| 5,411,231 A * | 5/1995 | Buck | 248/206.5 |
| 5,423,466 A * | 6/1995 | Moon | 224/324 |
| 5,454,615 A * | 10/1995 | Schnepf | 296/95.1 |
| 5,483,916 A * | 1/1996 | Kolvites et al. | 116/173 |
| 5,516,019 A * | 5/1996 | Moon | 224/324 |
| 6,213,440 B1 * | 4/2001 | Kornback | 248/514 |
| 6,250,148 B1 * | 6/2001 | Lynam | 73/170.17 |
| 6,886,793 B2 * | 5/2005 | Snell | 248/309.1 |
| 6,895,642 B2 * | 5/2005 | Huang | 24/303 |
| 6,899,635 B2 * | 5/2005 | Nadratowski et al. | 473/285 |
| 7,011,354 B1 * | 3/2006 | Gullickson | 296/97.11 |
| 7,066,434 B2 | 6/2006 | Kwok | |
| 7,259,727 B2 * | 8/2007 | Chan | 343/888 |
| 7,582,828 B2 | 9/2009 | Ryan | |
| D607,388 S | 1/2010 | Mahoney | |
| 7,878,467 B2 * | 2/2011 | Chen et al. | 248/206.2 |
| 7,896,520 B1 * | 3/2011 | Norling et al. | 362/191 |
| 8,191,846 B2 * | 6/2012 | Bresolin | 248/309.4 |
| 8,387,676 B2 * | 3/2013 | Hunckler et al. | 160/370.21 |
| 2004/0166955 A1 * | 8/2004 | Nadratowski et al. | 473/286 |
| 2004/0178307 A1 * | 9/2004 | Sim | 248/205.6 |
| 2007/0039750 A1 * | 2/2007 | Jantelezio | 174/50 |
| 2007/0171141 A1 * | 7/2007 | Chan | 343/888 |
| 2008/0054136 A1 * | 3/2008 | Gou | 248/205.5 |
| 2008/0078896 A1 * | 4/2008 | Browne et al. | 248/205.8 |
| 2008/0210835 A1 * | 9/2008 | Bagnall | 248/206.5 |
| 2009/0256038 A1 * | 10/2009 | Schaefer | 248/206.2 |

(Continued)

*Primary Examiner* — Nkeisha Smith
(74) *Attorney, Agent, or Firm* — Monty Simmons; William Simmons

(57) ABSTRACT

The invention relates to a magnetic based mounting apparatus configured for supporting and or securing devices to a surface such as the windshield of a car or a window glass. Such magnetic based mounting apparatus comprises a first magnetic component configured for being associated with a first side of a mounting surface and a second magnetic component configured for being disposed on an opposing second side of said mounting surface adjacent to said first magnetic component thereby magnetically associating the two magnetic components.

17 Claims, 8 Drawing Sheets

(56) References Cited

U.S. PATENT DOCUMENTS

2009/0289814 A1* 11/2009 Jarman ......................... 340/933
2010/0077642 A1* 4/2010 Kraft .............................. 40/711
2010/0320341 A1* 12/2010 Baumann et al. .......... 248/206.2
2012/0227678 A1* 9/2012 Milani ......................... 119/712
2012/0292466 A1* 11/2012 Song .......................... 248/205.4

* cited by examiner

MAGNETIC MOUNT

TECHNICAL FIELD OF THE INVENTION

The present invention relates to an apparatus for securely associating items in a desired position/location.

BACKGROUND OF THE INVENTION

Methods of associating various devices to windshields of automobiles are well known. Such devices typically comprise suction cup or adhesive based solutions. Prior art suction cup mounts, for example, can offer a variety of suction cup configurations and windshield mount configurations and include double suction cup mounts, twist lock mounts, flex arm mounts and ratchet/pivot mounts. When new, many such devices offer an easy to use method of associating items with almost any non-porous smooth surface such as a glass surface and steel. Consequently, it is not uncommon for such mounts to be used to hold any number of expensive electronic devices such as tablet computers, GPS devices, signal detectors, signal generators, mirrors, and communication devices.

One significant problem with both suction cup and adhesive mounting solutions is that they inevitably fail. As a result, the expensive devices being supported by such prior art mounts fall to a surface below which can cause damaged to such devices.

Embodiments of the disclosed invention are configured to eliminate or minimize such mounting failures.

SUMMARY

Some of the objects and advantages of the invention will now be set forth in the following description, while other objects and advantages of the invention may be obvious from the description, or may be learned through practice of the invention.

Broadly speaking, a principle object of the present invention is to provide a magnetic-based mounting apparatus configured for supporting devices.

Another general object of the present invention is to provide a magnetic-based mounting apparatus comprising a first magnetic component associated with a first side of a mounting surface and a second magnetic component configured for magnetically associating with said first magnetic component when disposed on an opposing second side of said mounting surface.

Another general object of the present invention is to provide a magnetic-based mounting apparatus comprising a first magnetic component defined by a mounting surface and a second magnetic component configured for being magnetically associated with said first magnetic component.

Another general object of the present invention is to provide a magnetic-based mounting system comprising a first magnetic component incorporated within a magnetically transparent structure and a second magnetic component configured for magnetically associating with said first magnetic component.

Another general object of the present invention is to provide a solar shield to protect suction cups associated with prior art prior art suction cup based mounts.

Yet another general object of the present invention is to provide a magnetic-based tether system for prior art suction cup based mounting systems wherein said magnetic-based tether system is configured to provide a backup support feature in the event the prior art suction cup based mounting system fails.

Additional objects and advantages of the present invention are set forth in the detailed description herein or will be apparent to those skilled in the art upon reviewing the detailed description. It should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which:

FIG. 6b is a side view of the exemplary second magnetic component depicted in FIG. 6a;

Figure 1:
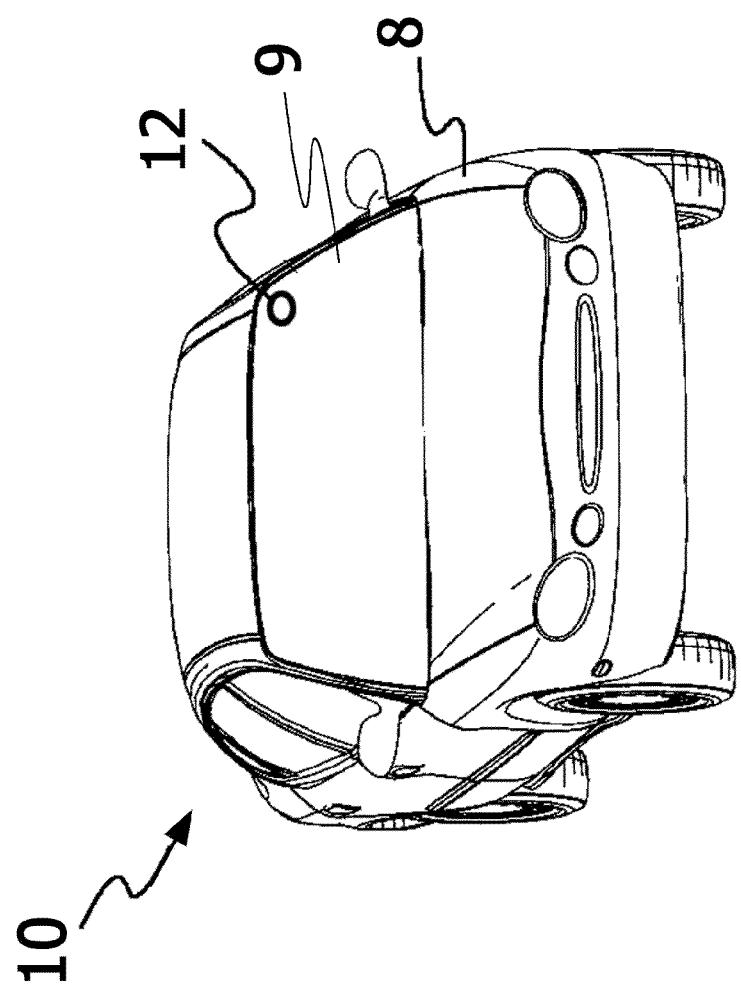
FIG. 1 is an elevated front perspective view of the outside of and exemplary automobile comprising a windshield associated with a magnetic mount according to one exemplary embodiment of the invention.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

Selected Definitions

For the purposes of this document two or more items are "associated" by bringing them together in any number of ways including electrically or mechanically. Items are "mechanically associated" by bringing them together or into relationship with each other in any number of ways including a direct or indirect physical connection that may be releasable (snaps, rivets, screws, bolts, etc.) and/or movable (rotating, pivoting, oscillating, etc.) Similarly, items are "electrically associated" by bringing them together or into relationship with each other in any number of ways including: (a) a direct, indirect or inductive communication connection, and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

Two items are magnetically associated by bringing them together or into a relationship where there is a magnetic communication, such as a non-negligible attracting force between the two items. A magnetic element comprises a ferromagnetic material. Ferromagnetic material includes materials (such as iron) that can form permanent magnets or are attracted to magnets and materials at least partially infused with ferromagnetic particle's to make normally non-magnetic material more like ferromagnetic material. Magnetically transparent materials include non-magnetic materials that are negligibly affected by magnetic fields such as copper, aluminum, gases, and plastic.

This document includes headers that are used for place markers only. Such headers are not meant to affect the construction of this document and do not in any way related to the meaning of this document nor should such headers be used for such purposes.

While the particulars of the present invention and associated technology may be adapted for use with any application where a user wishes to associate/mount an item with the surface of a magnetically transparent material, the examples discussed herein are primarily in the context of associating a device to the surface of a glass structure such as the windshield of a vehicle.

Written Description

Referring now to FIG. 1, a front perspective view of the outside of and exemplary automobile (10) comprising a windshield (9) associated with a magnetic mounting system according to one exemplary embodiment of the current invention wherein said magnetic mounting system comprises a second magnetic element (12). As will be defined in more detail below, second magnetic element (12) may be any suitable device including a plate comprising a ferromagnetic material, a plate comprising ferromagnetic material encased in a protective coating, a plate comprising a ferromagnetic material and configured to convey visual information, ferromagnetic material that generates a magnetic field (such as a magnet), and a magnetic field generator configured to convey visual information.

Figure 2:
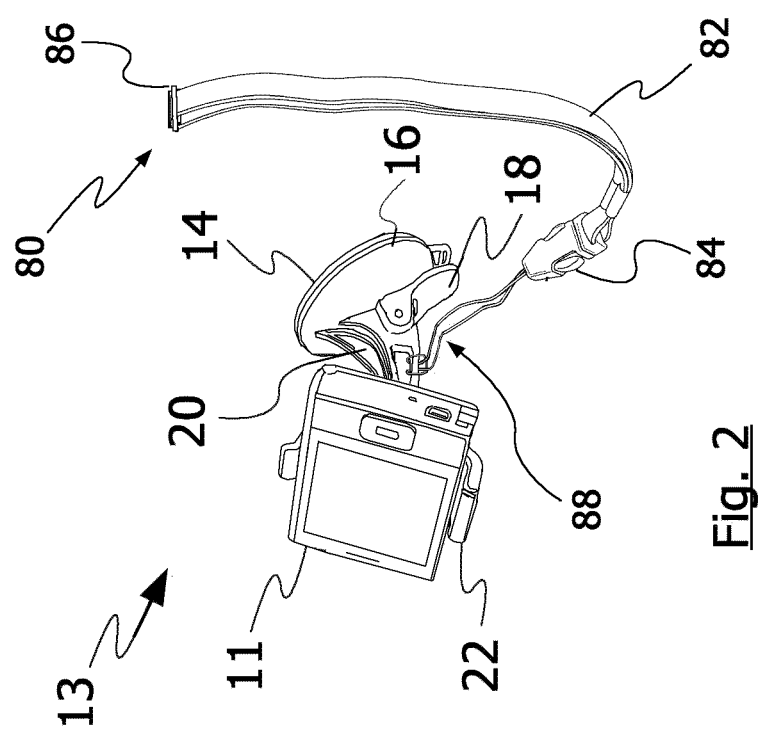
FIG. 2 is a side perspective view of one exemplary embodiment of a magnetic mount holding a communication device.

As depicted in FIG. 2, a side perspective view of one exemplary embodiment of a magnetic mount (13) holding a communication device (11) is presented. For the currently preferred embodiment of the invention, magnetic mount (13) comprises both a suction cup component (14) and a magnetic element (16). The back side of magnetic element (16) defines, or is mechanically associated with, a support arm (20) which is further associated with an item interface (22) configured for receiving an electronic communication device (11). For such embodiment, magnetic mount (13) may be used as a typical suction cup based mount and/or as a magnetic-based mount. Magnetic element (16) comprises a magnetic component that is one of: (a) configured for generating a magnetic field (such as a magnetic); and (b) configured for being attracted to a magnetic field (such as a ferromagnetic steel plate). One of ordinary skill in the art will appreciate that when the magnetic features of magnetic mount (13) are being used as depicted in FIG. 1, the magnetic element (16) is placed in magnetic communication with a second magnetic element on an opposing side of a magnetically transparent material such as the windshield of a car. As depicted in FIG. 1, such second magnetic element is magnetic element (12) associated with the outside surface of vehicle (10) windshield (9). Additionally, as will be described in more detail below, the various magnetic mounting systems my further include an optional magnetic tether (80).

Figure 3:
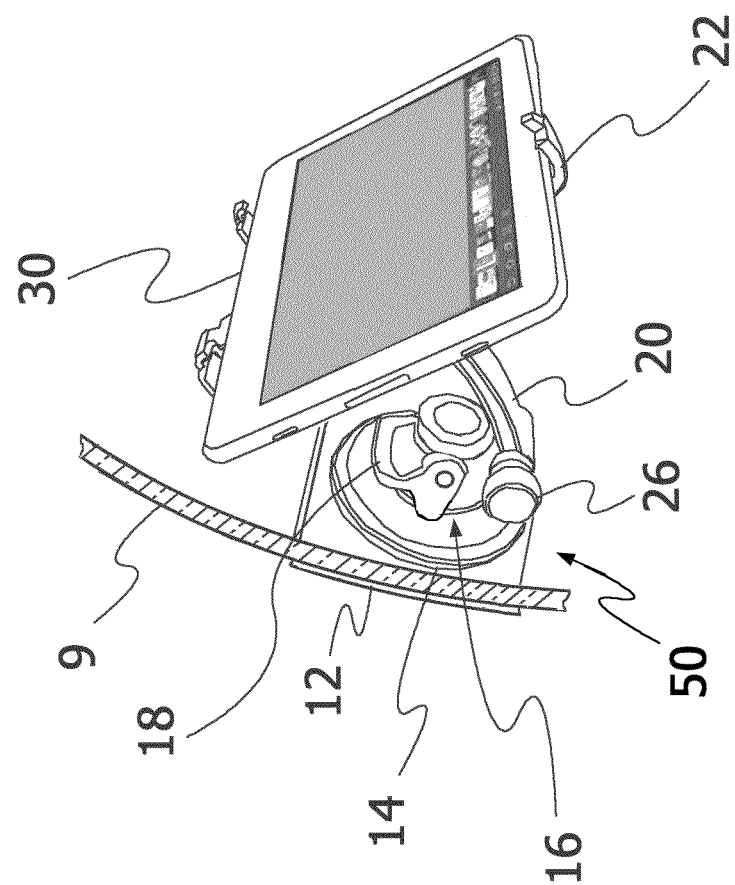
FIG. 3 is a side perspective view of one exemplary embodiment of a magnetic mount associated with the windshield of a vehicle and holding a tablet computer and further depicting a cutaway section of the vehicle's windshield and an exemplary embodiment of an outside magnetic component in magnetic communication with said magnetic mount.

Referring now to FIG. 3, a side perspective view of one exemplary embodiment of a magnetic mount (50) comprising a first magnetic element (16) and suction cup component (14) associated with a first surface of a support structure; glass structure (9). Magnetic mount (50) comprises a support arm (20) configured with an interface (22) suitable for holding a device such as tablet computer (30). Adjustor (26) is a simple common prior art adjustor that allows a user to adjust the position of support arm (20) as desired. FIG. 3 further depicts a cutaway section of the glass structure (9) to better show an exemplary embodiment of a second magnetic element (12) associated with the opposing second surface of glass structure (9) immediately adjacent to first magnetic element (16) so that second magnetic element (12) is in magnetic communication with first magnetic element (16) and establishing a sufficient attracting force to provide a supporting function.

For such embodiment, magnetic element (12) defines a generally rectangular shape defining a set of opposing angled edges as will be described in more detail below. One of ordinary skill in the art will appreciate that, as long as the magnetic attraction between the first magnetic element (16) and second magnetic element (12) is sufficient to carry the load associated with magnetic mount (50), such magnetic association will not fail as the second magnetic element (12) cannot pull through windshield (9) (also assuming structure (9) can support the weight). That said, ideally, the strength of the attraction between first magnetic element (16) and second magnetic element (12) should be selected to fail before the supporting structure (9) fails.

Notably, alternative embodiments for magnetic mount (50) include magnetic mounts configured with only a magnetic element (16) (i.e. no suction cup component (14)). Further, either one or both of magnetic component (12) and magnetic component (16) may define a permanent magnet or electro-magnetic magnetic. Such permanent magnet may be constructed from rare earth metals such as Neodymium-Iron-Boron (Neo magnets, sometimes referred to as "super magnets"), and Samarium-Cobalt. Special alloys, such as Aluminum-Nickel-Cobalt (Alnicos) and Strontium-Iron (Ferrites, also known as Ceramics), that are known to create suitable magnets may also be used. Electro-magnets may also be used in place of permanent magnets. Preferably, the magnetic components are "shaped" and constructed to have sufficient pull strength to support the anticipated load, or a pre-defined maximum load, for magnetic mount (50).

For example, to associate and support the typical weight of a GPS device (10 ounces) to a windshield of normal thickness during reasonable driving conditions, a 25 mm×2 mm round disc rare earth neodymium magnet may be used for magnetic element (12) and magnetic element (16). Alternatively, one of magnetic element (12) or magnetic element (16) may be made of a ferromagnetic material while the other defines a permanent magnet. The strength of the magnetic bond is determined, at least in part, by the shape of the magnetic material, the strength of the permanent magnet (size and type of magnet), the amount of ferromagnetic material (i.e. size of the metal plate, if a metal plate is used in place of a magnet), and the gap between the two magnetic elements. For one alternative embodiment at least one of such parameters for the magnetic mounting system are configurable to accommodate different mounting challenges.

Figure 4:
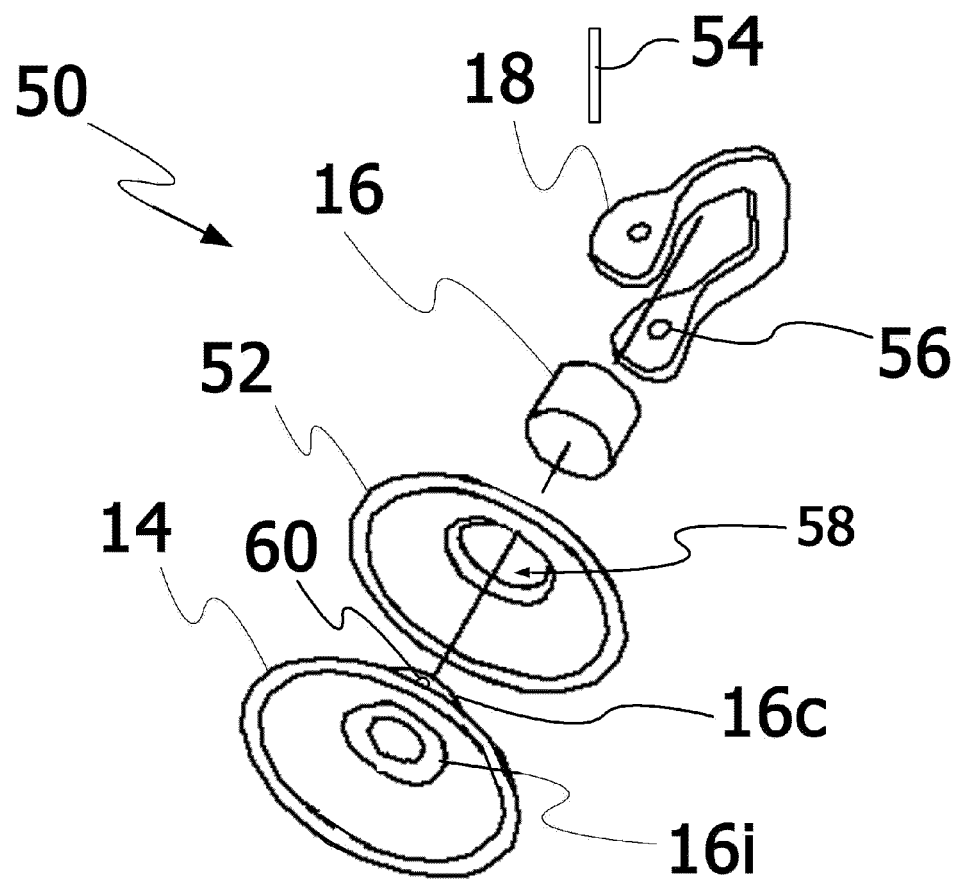
FIG. 4 is a side perspective exploded view of one exemplary embodiment of the invention comprising a suction cup and magnetic interface.

Referring now to FIG. 4, a side perspective exploded view of one exemplary embodiment of magnetic mount (50) comprising a suction cup component (14), a pressure plate component (52), a magnetic component (16), and a cam lock (18) is presented. Suction cup component (14) comprises a cup section defining the general shape of a circular concave suction cup. As depicted in FIG. 4, a magnetic component receiver (16c), defining a blind hollow cylinder, extends perpendicularly from the approximate center of the cup section. Such magnetic component receiver (16c) is one of integral to, and mechanically associated with, said suction cup section. For the current embodiment, magnetic component receiver (16c) is integral to said suction cup section thereby defining one component. At least one of said suction cup section and said magnetic component receiver (16c) define magnetic interface (16i) disposed in the approximate center of the cup section. For the currently preferred embodiment, the magnetic interface (16i) defines the blind end of the blind hollow cylinder described above. Magnetic interface (16i) is further configured for receiving magnetic component (16). A first pin interface (60) is defined at the distal end of such blind hollow cylinder. Further, Magnetic interface (16i) may be either ferromagnetic or magnetically transparent. Additionally, while magnetic component receiver (16c) and magnetic element (16) are depicted as defining a cylinder, any polygonal shape or prism shape may be used without departing from the scope and spirit of the invention.

For the current embodiment, magnetic mount (50) further comprises a pressure plate component (52) defining an opening (58) at the approximate center wherein said pressure plate component (52) is configured to be disposed adjacent to the back side of said suction cup section so that said magnetic component receiver (16c) extends through opening (58).

Magnetic mount (50) further comprises a first magnetic element (16) defining a cylinder with an outer diameter that is slightly less than inside diameter of magnetic component receiver (16c) so that first magnetic element (16) may be inserted into magnetic component receiver (16c) and adjacent to magnetic interface (16i). Notably the length of the cylinder defined by first magnetic element (16) is shorter than the distance from first pin interface (60) and magnetic interface (16i).

Magnetic mount (50) further comprises a pressure activator defining a second pin-interface (56) moveably and mechanically associated first pin interface. Pressure activator is configured to selectively apply pressure to said pressure plate component (52) so that the pressure plate component (52) presses against the back side of said suction cup component (14) to remove at least part of the air from the space between the suction cup component (14) and support surface (9) thereby generating a vacuum pressure between the suction cup component (14) and a surface of support structure (9). For the exemplary embodiment depicted in FIG. 4), pressure activator defines a cam lock (18) defining pin interface (56). Cam lock (18) is configured to be rotatable about pin (54) to press pressure plate (52) against suction cup component (14). When suction cup component (14) is placed against a non-porous smooth surface (such as the surface of a windshield), cam lock (18) is used to press the suction cup component (14) against the support surface thereby forcing out enough of the air between the two components to create a vacuum pressure thereby mechanically associating magnetic mount (50) with a surface of support structure (9). If magnetic mount (50) is also positioned adjacent to a second magnetic element, where such second magnetic element (12, FIG. 3) is disposed on an opposing side of the support surface (9), the magnetic attraction between first magnetic element (16) and second magnetic element (12) magnetically associates the two components together thereby enhancing the support features of magnetic mount (50).

Additionally, for such configuration, the suction cup provides a "no-slip feature" when cam lock (18) is actuated and creating a vacuum seal. Further, unlike prior art suction cup based mounting devices, for the configuration depicted in FIG. 4, magnetic mount (50) can be used with surfaces that do not allow a vacuum pressure to be created (e.g. unsmooth and/or porous surfaces) as long as the magnetic association between the first magnetic component (16) and the second magnetic component (12) is strong enough to support the associated load. In fact, for one alternative embodiment, magnetic mount (50) provides for only magnetic mounting and has no suction cup component (14). For such alternative embodiment, pressure plate (52) defines the magnetic component receiver and magnetic interface.

From the above, one of ordinary skill in the art will appreciate that magnetic mount (50) is assembled by:
  i. inserting a magnetic component (16) into the blind hollow cylinder defined by magnetic component receiver (16c);
  ii. inserting the magnetic component receiver (16c) through the opening defined by pressure plate (52);
  iii. associating cam lock (18) with magnetic component receiver (16c) so that pin interface (56) is in alignment with pin interface (60); and
  iv. inserting pin (54) through the pin interfaces (56) and (60).

Figure 5A:
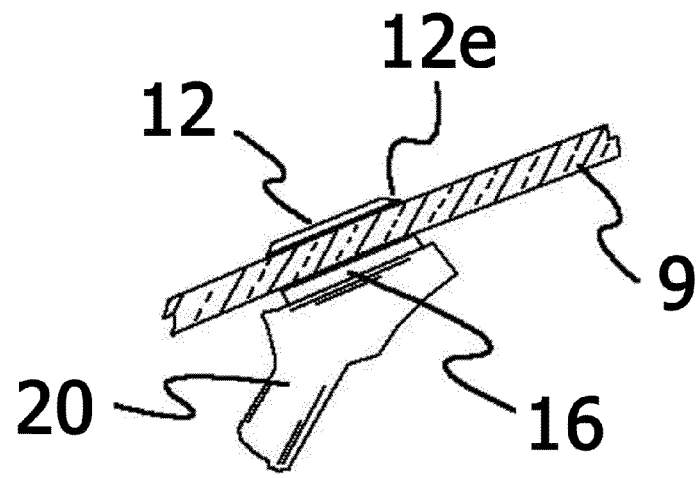
FIG. 5a is a side view of one exemplary embodiment of the invention depicting a magnetic mount comprising a first magnetic component associated with a first surface of a glass structure and further depicting an exemplary second magnetic component associated with the opposing second surface of said glass structure and adjacent to said first magnetic component.
Figure 5B:
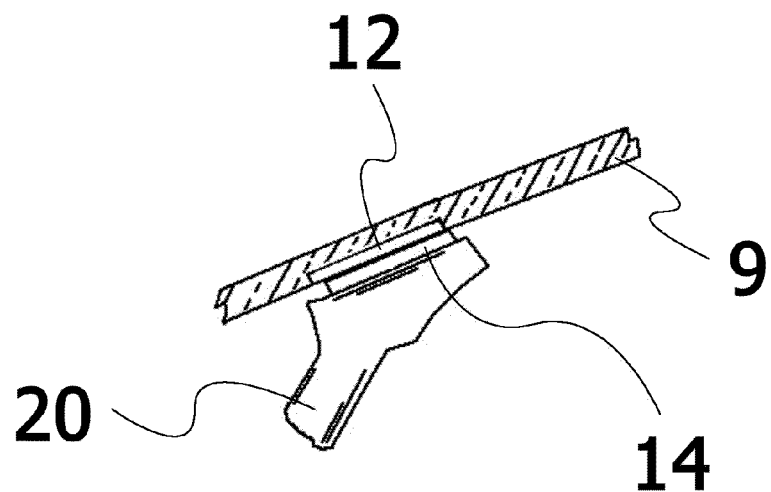
FIG. 5b depicts one alternative embodiment of the invention depicted in FIG. 4 with the second magnetic component integrated into the glass structure.

Referring now to FIG. 5a and FIG. 5b, side views of two alternative embodiments of the invention without a suction cup interface are presented. FIG. 5a presents an exemplary embodiment of the invention depicted as a magnetic mounting system comprising a first magnetic element (16) associated with a first surface of a support structure constructed from magnetically transparent material (hereafter glass structure (9)). The magnetic mounting system further comprises an exemplary second magnetic element (12) associated with the opposing second surface of glass structure (9) and adjacent to said first magnetic component (16).

For the currently preferred configuration, it may be desirable to configure one of the services associated with glass structure (9) with a no-slip feature to prevent the magnetic mount from sliding when in use. For example, the surface (46, FIG. 6b) may be associated with a material that will not easily slide across the surface of the support structure thereby providing the above described no-slip feature. Where the support structure is glass, the surface (46) may be covered with a rubber material. Similarly, magnetic element (12) may be encased in an at least partially magnetically transparent protective material. Additionally, glass structure (9) may be configured with a substance such as glue or rubber or some other material that does not slide easily when in contact with glass.

For some embodiments of the invention, neither surface of the magnetic elements is configured with a no-slip feature which allows easy movement of the magnetic mount. For such embodiment of the invention, a user may grab support arm (20), for example, and slide the mounting system to a desired location causing magnetic element (12) to follow magnetic element (16). For example, when it is not raining a user may position the magnetic mount system in the vicinity of the rearview mirror for vehicle (10) for easier viewing/use of the device being supported by all passengers in a vehicle. If it should start to rain, however, magnetic element (12) may interfere with proper windshield wiper functions and a user may wish to slide the magnetic mount to a different location such as the upper left-hand driver's-side corner of a vehicle's windshield as depicted in FIG. 1. Alternatively, a passenger in a vehicle (10) may wish to slide the magnetic mount to a position that is more convenient for the passenger to see and/or enter data. Such can be easily achieved when neither magnetic element (12) nor magnetic element (16) are configured with a no-slip feature.

FIG. 5b depicts yet another alternative embodiment of a magnetic mount without a suction cup interface. For this currently preferred embodiment of the invention, magnetic element (12) is incorporated/integrated into the glass structure (9). For such a configuration, glass structure (9) may define a plurality of magnetic elements disposed at a plurality of positions along the windshield. Further, the normally non-ferromagnetic material may be completely or partially manufactured with a predefined amount of ferromagnetic particles that define a suitable magnetic interface. For example, ferromagnetic particles may be incorporated into glass to define ferromagnetic glass. More specifically, at least a portion of a windshield may define a section of ferromagnetic glass that is suitable for use as one of the magnetic elements of a magnetic mounting system.

Figure 6A:
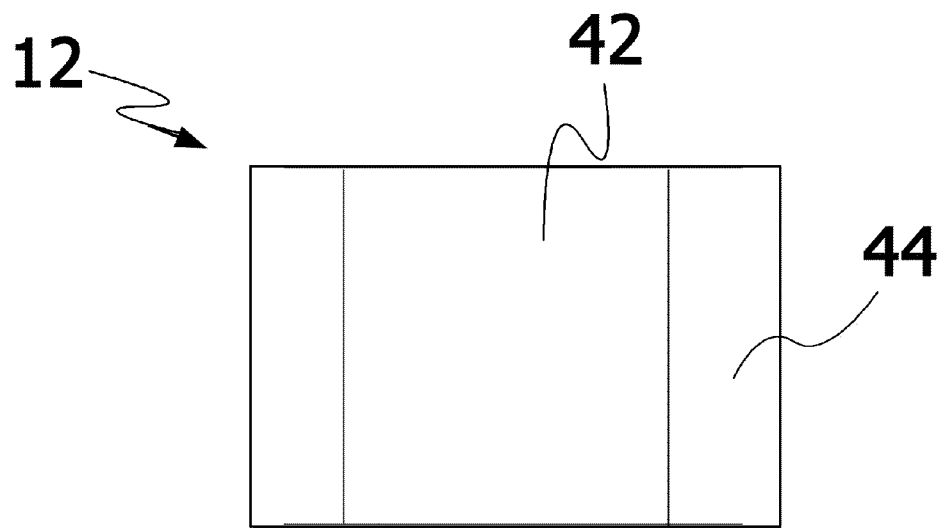
FIG. 6a is a top view of one exemplary embodiment of a second magnetic component.
Figure 6B:
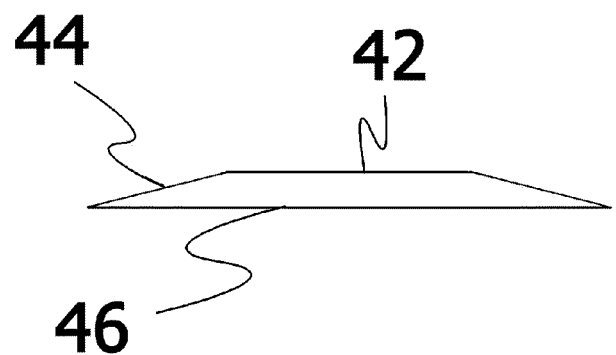

Referring now to FIG. 6a and FIG. 6b, a top and side view of one exemplary embodiment of a second magnetic element (12) is presented. While the outer perimeter of magnetic element (12) may define any polygonal shape, for the currently embodiment the outer perimeter of magnetic component (12) simply defines a rectangle defining a length and width about equal to the diameter of the suction cup section of magnetic mount (50) as described above. Notably, the outer perimeter of magnetic component (12) may also define a circle as depicted in FIG. 1.

As best seen in FIG. 6b, the edges (44) of the second magnetic element (12) are angled so that surface (42) is smaller than the surface (46). Such a configuration minimizes the interference that magnetic element (12) may cause with other systems such as windshield wipers by allowing objects to more easily pass over the second magnetic element (12).

Notably, surface (46) is depicted as being straight/flat in FIG. 6b. It will be appreciated that the shape of surface (46) may define any shape as needed to best suit the anticipated use. For example, surface (46) may define a concave form that better matches the curvature of a typical windshield.

For yet another exemplary embodiment of the invention, second magnetic element (12) may be configured to convey visual information. For example, second magnetic element (12) may define the shape of the number a user's favorite stock car racer, the emblem of their favorite sports team, their school mascot, the trademark of a user's favorite sports equipment, or some other bit of information a user may wish to communicate to a remote observer.

It will be appreciated that the above technology can be used with various "mount" configurations that are useful for a plurality of purposes. For example, the simplest version is a two magnet system, one associated with the inside surface of a vehicle's windshield and one associated with the outside of a vehicle windshield. The magnet on the inside my be used to hold any number of items comprising, or associated with, ferromagnetic material including writing tools (pencils, pens), clip boards, glasses, glass cases, cell phone, keys, and document holders.

Figure 7:
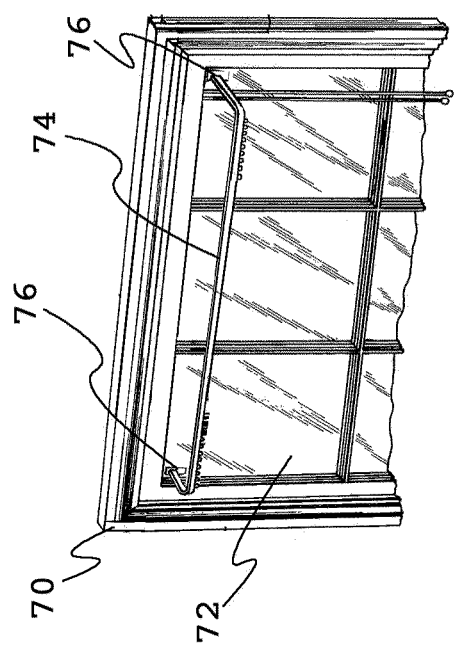
FIG. 7 is an elevated view of a magnetic mount system for drapery/curtains.

Further, while the applications above have been directed mainly towards providing a mounting feature for electronic devices where the mouth is associated with the windshield of the vehicle. There are numerous other applications for the disclosed technology including associating items with windows (70) in buildings. For example, as depicted in FIG. 7, for one alternative embodiment, the magnetic mounting system is configured with mounting hardware (76) associate with drapery rods. Such mounting hardware (76) comprises a first magnetic element defining a "no-slip" feature configured for being associated with one side of a window glass (72) adjacent to a second magnetic interface defining a "no-slip" feature and associated with the opposing side of window glass (72). One of ordinary skill in the art will appreciated that such a magnetic mounting system eliminates the need to use nails or screws. Notably, the second magnetic interface may further be configured to provide further features such as proving a hanger for a plant or flag pole interface or decorative items. In addition, alternative embodiments of the disclosed magnetic mount may be used to provide a support function that associates any number of items other than curtains with the surface of magnetically transparent materials.

UV Blocker

Another aspect of the present invention is to provide a protective feature for magnetic mount (50) when used as a typical suction cup mount. As is well known, a suction cup is a device that is generally made out of a malleable polymer material such as plastic and rubber material and has the shape of half of a sphere. Because of their malleable nature, they can adhere to smooth nonporous surfaces (e.g. glass and metal). When such suction cups are used in mounting devices where the suction cups are associated with the windshield of a vehicle, the materials used to form the suction cups is typically exposed to long durations of ultra-violet radiation.

When exposed to ultra-violet radiation, many natural and synthetic polymers may crack or disintegrate. The problem is known as UV degradation, and is a common problem in products exposed to sunlight. Even UV-stable polymers will degrade over time from constant exposure to ultra-violet radiation.

For magnetic mount (50) configurations comprising a suction cup feature, second magnetic element (16) may further define or be associated with a UV Blocker constructed from a material that blocks ultraviolet radiation such as titanium dioxide and zinc. For such embodiment, the UV Blocker defines a thin film that is associated with either (or both) the outside and/or inside surface of windshield (9) adjacent to the area where the suction cups of magnetic mount (50) are to be associated. The UV Blocker is to have sufficient size to prevent sunlight from directly striking the suction cup portion of magnetic mount (50).

Similarly, shielding an item associated with magnetic mount (50) form direct sunlight may be desirable. Thus, one or both of the second magnetic element (12) and a surface of magnetic mount (50) may define a UV shield of sufficient size to block/minimize the direct sunlight reaching an item being supported by magnetic mount (50).

Figure 8:
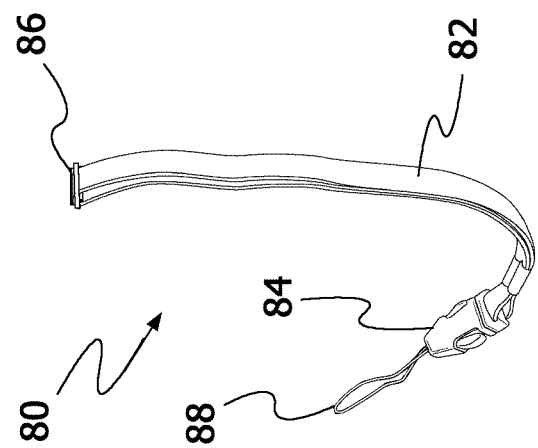
FIG. 8 is a side perspective view of a magnetic tether.

Referring now to FIG. 8, one exemplary embodiment of a magnetic tether (80) is presented. Magnetic tether (80) comprises a tether (82) which is adjustably mechanically associated with magnetic element (86) at one end and releasably associated with the latching mechanism (84) at the opposing end. Latching mechanism (84) further comprises a tether interface (88) configured for being mechanically associated with an item to be tethered to magnetic element (86). As depicted in FIG. 2, tether interface (88) is mechanically associated support arm (20) and the magnetic element (86) is preferably magnetically associated with a support surface constructed from ferromagnetic material. Consequently, should the magnetic mounting system (13, FIG. 2) failed, the mounting system and associated electronics will only fall as far as the length of magnetic tether (80).

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A mounting apparatus configured for mechanically associating an item to surfaces of a magnetically transparent support structure, said mounting apparatus comprising:
   a suction cup component having a concave suction cup structure defining a suction surface comprising a center point and configured to create a vacuum pressure with a first surface of said magnetically transparent support structure and an opposing outer surface wherein said suction surface and said opposing outer surface define a magnetic interface at said center point and wherein said outer surface defines a magnetic component receiver adjacent to said magnetic interface wherein said magnetic interface is a ferromagnetic or magnetically transparent ring around the center point;
   a first magnetic component associated with said magnetic component receiver and magnetically associated with said magnetic interface;
   a second magnetic component configured for being associated with a second surface of said magnetically transparent support structure wherein said second surface is adjacent to said first surface and is one of (a) a ferromagnetic block wherein at least two opposing ends are angled and (b) shaped to convey visual based information; and
   an item support interface configured to receive said item to be mechanically associated with said magnetically transparent support structure wherein said item support interface is mechanically associated with at least one of (a) said suction cup component and (b) said first magnetic component.

2. A mounting apparatus as in claim 1, wherein said second magnetic component defines a no-slip feature.

3. A mounting apparatus as in claim 2, wherein said visual based information includes at least one of words and icons.

4. A mounting apparatus as in claim 3, further comprising a tether component configured for being mechanically associated with at least one of (a) said suction cup component and (b) said first magnetic component.

5. A mounting apparatus as in claim 4, wherein said second magnetic component is mechanically associated with a UV Blocker of sufficient size to block at least some UV radiation from reaching said suction cup component.

6. A mounting apparatus as in claim 1, further comprising a pressure plate component defining a pressure activator, said pressure plate component mechanically associated with said suction cup component so that the pressure plate component applies pressure to the suction cup component when the pressure activator is actuated.

7. A mounting apparatus as in claim 6, wherein said pressure activator is a cam lock movably mechanically associated with said magnetic component receiver and wherein said cam lock is configured to selectably press said pressure plate component against said suction cup component.

8. A mounting apparatus configured for mechanically associating an item to surfaces of a support structure, said mounting apparatus comprising:
   a suction cup component defining a center point and comprising a suction cup section side and an opposing back side, wherein:
      (a) said suction cup section side defines the shape of a circular concave suction cup that is one of (i) associated with a magnetic interface at said center point, and (ii) defines a magnetic interface at said center point; and wherein said suction cup section side is further configured for creating a vacuum pressure with a first surface of said support structure;
      (b) a magnetic component receiver is on said opposing back side and defines a hollow housing extending perpendicularly from said magnetic interface to a distal end, and wherein said hollow housing is configured for receiving a magnetic component, and wherein said distal end defines a housing pin interface;
   said first magnetic component disposed inside said hollow housing and magnetically associated with said magnetic interface;
   a pressure plate component defining an opening at its center having a diameter that is larger than a diameter of said hollow housing and wherein said pressure plate component is disposed adjacent to said opposing back side of said suction cup component with said magnetic component receiver extending through said opening; and
   a pressure activator defining a pin-interface moveably mechanically associated with said housing pin interface, wherein said pressure activator is configured to selectively apply pressure to said pressure plate component so that the pressure plate component presses against said suction cup component to remove at least part of the air from a space between the suction cup component and said first surface of said support structure to generate a vacuum pressure between said suction cup section side and said first surface of said support structure.

9. A mounting apparatus as in claim 8, wherein said magnetic component receiver is mechanically associated with said suction component.

10. A mounting apparatus as in claim 8, wherein said magnetic interface is integral to said suction cup component.

11. A mounting apparatus as in claim 8, wherein said magnetic interface is magnetically transparent.

12. A mounting apparatus as in claim 8, wherein said pressure plate component defines a permanent magnet.

13. A mounting apparatus as in claim 8, wherein said support structure is magnetically transparent, and wherein said mounting apparatus further comprises a second magnetic component configured for being associated with a second surface of said support structure.

14. A mounting apparatus as in claim 13, wherein said second magnetic component defines a no-slip feature.

15. A mounting apparatus as in claim 13, wherein said second magnetic component is further configured to convey visual based information including at least one of words, logos, and icons.

16. A mounting apparatus as in claim 13, wherein at least two opposing edges said second magnetic component are angled.

17. A mounting apparatus as in claim 8, further comprising a tether component configured for being mechanically associated with at least one of said (a) suction cup component, (b) first magnetic component, and (c) pressure plate component.

\* \* \* \* \*